Feb. 21, 1956   W. H. C. NESS   2,735,535
REINFORCEMENT FOR FLIGHTS IN ENDLESS METAL CONVEYORS
Filed April 6, 1953

William H. C. Ness,
INVENTOR.

BY
ATTORNEY.

United States Patent Office 2,735,535
Patented Feb. 21, 1956

2,735,535

REINFORCEMENT FOR FLIGHTS IN ENDLESS METAL CONVEYORS

William H. C. Ness, Los Angeles, Calif., assignor to National Cornice Works, Los Angeles, Calif.

Application April 6, 1953, Serial No. 347,120

2 Claims. (Cl. 198—195)

This invention relates to a reinforcement for flights in endless metal conveyors.

The use of metal flight sections in endless conveyors is not new in the art, but the manner of reinforcing them to make them adaptable for carrying heavier loads than that originally intended for the stock flight has presented a problem for the manufacturer.

The present invention offers a solution to this problem, which constitutes an important object thereof.

Heretofore it has been a common practice to provide endless metal conveyors with flight sections having depending reinforcing flanges and these flanges have strengthened such conveyors to the extent required for sustaining the loads they were originally designed to carry, but of late these reinforcing flanges have been found inadequate for the intended purpose, because of some of such conveyors now being required to carry much heavier loads. Accordingly, it is an object of the present invention to provide the aforesaid additional reinforcement when required, and to do this on stock conveyor flights.

A more specific object of the invention is to provide die shaped reinforcing plates which can be readily applied to and spot welded into place upon the joint portions of the flights of endless metal conveyors, now on the market, the spaces between the hinge leaves of such conveyors being utilized to admit to their operative positions the electrodes used in the spot welding operations.

Another specific object is to provide, for the flights of endless metal conveyors, a one-piece box type reinforcement which will embrace the outer part of the conveyor flange to which it is applied and which will therefore be applicable to said flange by means of a minimum amount of welding applied only to the inner part of the box shaped structure.

Accordingly it is an object of the present invention to provide, for attachment to said conveyor flanges, which augment their stiffening property to such an extent that the conveyor is prevented from buckling or bending out of shape under the additional stress to which it is subjected when required to carry the aforesaid heavier loads.

Other objects, advantages and features of invention will hereinafter appear.

Referring to the accompanying drawing, which illustrates a preferred, reduced to practice embodiment of the invention, Fig. 1 is a fragmentary cross section on line 1—1 of Fig. 2.

Figure 1:
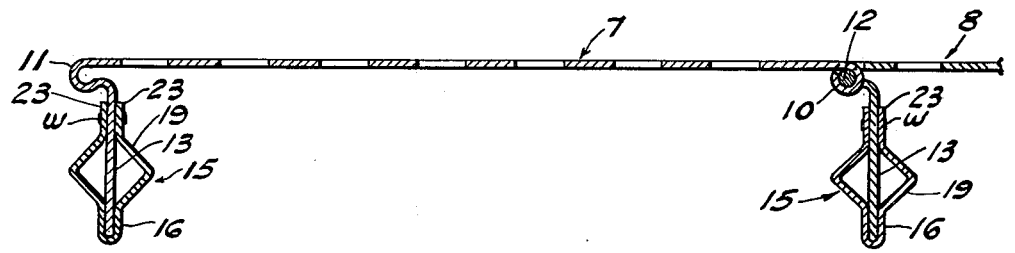
Figure 2:
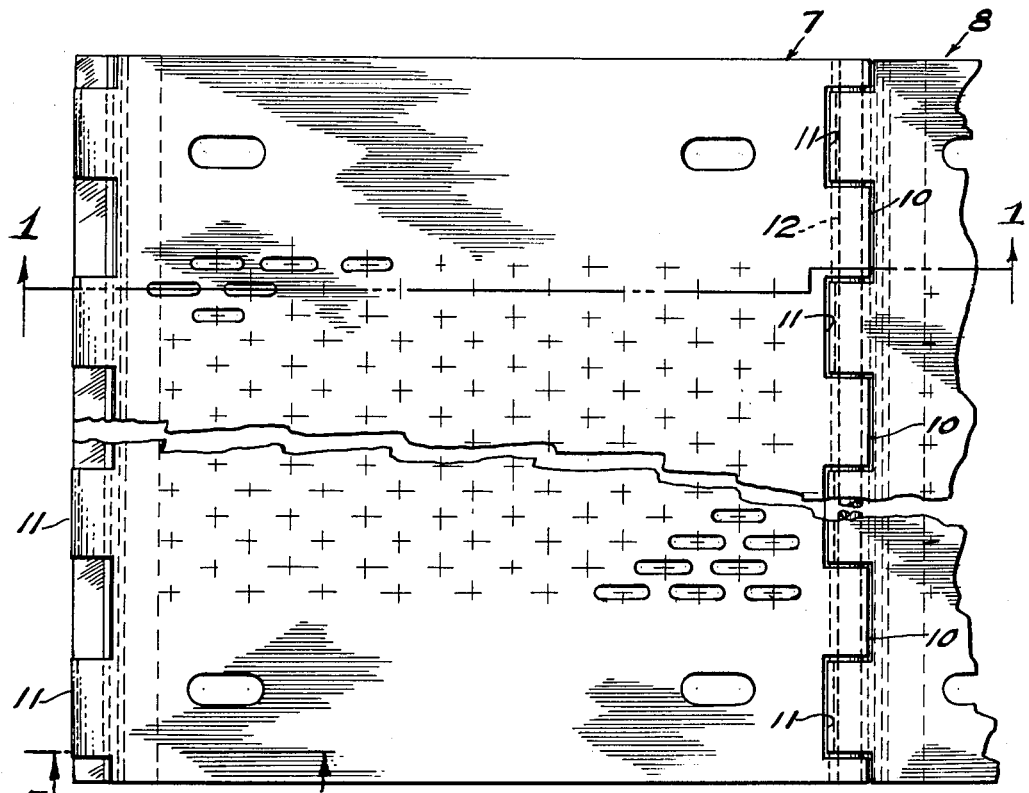
Fig. 2 is a plan view of the structure shown in Fig. 1.

Referring in detail to the drawing, in each of Figs. 1 and 2 is shown a complete endless conveyor flight section 7 and a fragment of an adjacent flight section 8, said flight sections 7 and 8 being joined by a piano hinge structure comprising the hinge leaves 10 and 11 and hinge pin 12.

Each hinge part 11 carries a reinforcing flange 13 which extends across the entire width of the conveyor flight section. Separately considered, this forms no part of the present invention. But, by the present invention there is provided for each of said flanges 13 a reinforcing plate 15 having a doubled over midwidth portion 16 of which snugly embraces the outer edge portion of said hinge flange 13, the side portions of said plate abutting and being welded to the opposite faces of the inner portion of each of said flanges 13 by spot welds w. Between said welded on side portions of said plate 15 and its doubled over midwidth portion 16, the applied plate has a substantially square box portion 19 through which said hinge flange 13 diagonally extends, so that the corner portions of this box structure form twin reinforcing struts for each conveyor flight section extending across its entire width to prevent its transverse deformation when subjected to heavy loads.

Figure 3:
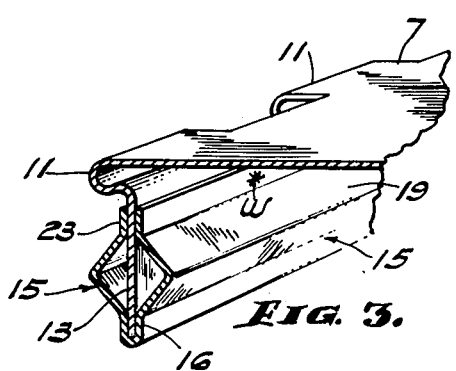
Fig. 3 is a fragmentary perspective showing one of the reinforcements applied to a flange of a conventional conveyor flight section.

The already mentioned spot welds w occur in the gaps between the aforesaid hinge parts 11, as illustrated in Fig. 3, said gaps enabling the workman readily to apply said welds before the flight sections are assembled.

Figure 4:
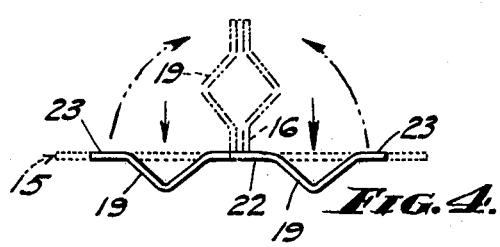
Fig. 4 is an end elevation illustrating successive steps in die shaping the reinforcement provided by the invention.

In Fig. 4 the first step in die forming a reinforcing plate for the aforesaid box structure is shown in full lines and the next, the final step in the formation thereof, is shown in dotted lines. By the first step the two box corner portions 19 are formed between the straight midwidth part 22 (designated 16 as doubled over), and plate side portions 23, and by the next movement of the die the plate parts 19, 22 and 23 are given the box like shape shown in dotted lines in Fig. 4, in readiness for the plate parts 23 to be welded to the aforesaid hinge flange 13 which they embrace.

It is to be understood in speaking of the box like shape of the reinforcement provided by this invention it is not intended to limit said reinforcement to a rectangular contour, as boxes may have other than rectangularly related side portions and their walls are not always flat. Viewing the applied plate 15 as shown in Fig. 3, it is to be observed that, between the midwidth portion of said plate and each welded on side portion thereof there is an outwardly deflected, symmetrical plate portion (shown as right angular), which serves as a reinforcing strut for the flange 13 which extends across the entire width of each conveyor flight section.

I claim:

1. In combination with the flight section of an endless conveyor having adjacent flight sections united by hinges, each of said hinges having a flat reinforcing flange which extends transversely to the path of movement of the flight section, a reinforcing plate formed from a single piece of metal, said plate being bent back on itself at the center to provide a midwidth portion which snugly embraces the outer edge portion of the flange, said midwidth portion abutting and extending substantially parallel to the outer portions of the flange on opposite sides thereof, said reinforcing plate having a pair of side portions abutting and extending substantially parallel to the inner portion of the flange on opposite sides thereof, said side portions being attached to the inner portion of said flange, said reinforcing plate having between its center and each of its side portions a reinforcing part deflected outwardly from said flange, said outwardly deflected reinforcing parts combining to form a hollow beam reinforcement for the flange of said flight section, said flange extending substantially diagonally across said hollow beam to form a diagonally reinforced hollow beam structure which permits said flight section to carry a heavier load.

2. In combination with the flight section of an endless conveyor having adjacent flight sections united by hinges, each of said hinges having a flat reinforcing flange which extends transversely to the path of movement of the flight section, a reinforcing plate formed from a single piece of sheet metal, said plate being bent back on itself at the center to provide a midwidth portion which snugly embraces the outer edge portion of the flange, said midwidth portion abutting and extending substantially parallel to the outer portions of the flange on opposite sides thereof, said reinforcing plate having a pair of side portions abutting and extending substantially parallel to the inner portion of the flange on opposite sides thereof, the abutting surface of each of said side portions being welded to the inner portion of said flange, said reinforcing plate having between its center and each of its side portions a substantially triangular reinforcing part deflected outwardly from said flange, said outwardly deflected reinforcing parts combining to form a hollow box beam reinforcement for the flange of said flight section, said flange extending substantially diagonally across said box beam to form a reinforced box beam structure which permits said flight sections to carry a heavier load.

References Cited in the file of this patent

UNITED STATES PATENTS

| | | |
|---|---|---|
| 1,873,865 | Allsop | Aug. 23, 1932 |
| 1,883,528 | Buck | Oct. 18, 1932 |